Sept. 21, 1926. 1,600,233
C. G. E. LARSSON
EYEBAR AND METHOD OF MAKING THE SAME
Filed July 2, 1924
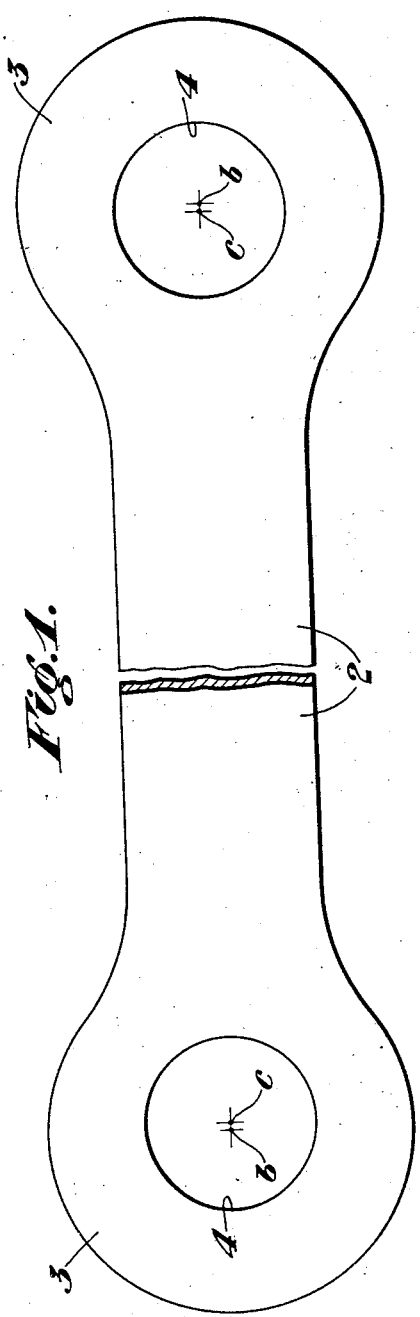
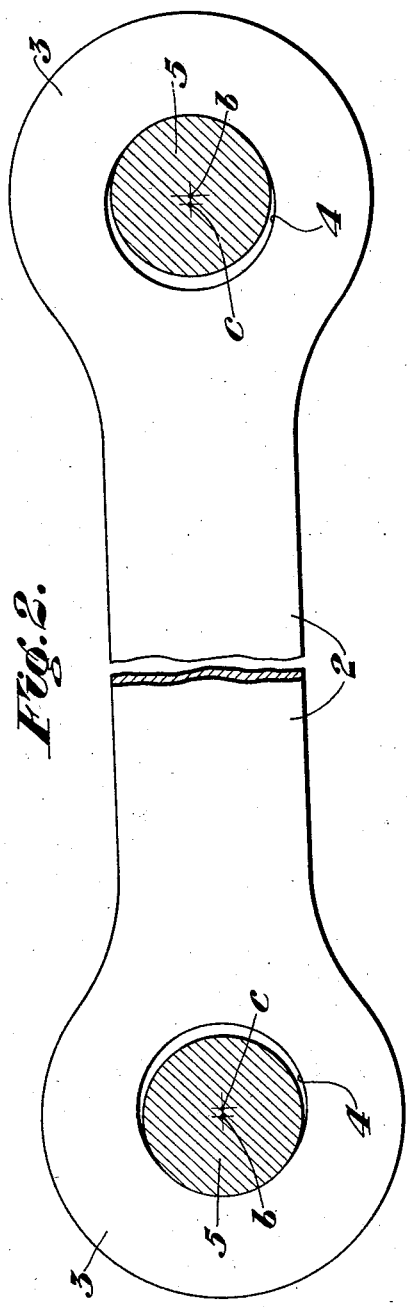

Patented Sept. 21, 1926.

1,600,233

UNITED STATES PATENT OFFICE.

CARL GUSTAF EMIL LARSSON, OF PLAINFIELD, NEW JERSEY.

EYEBAR AND METHOD OF MAKING THE SAME.

Application filed July 2, 1924. Serial No. 723,761.

My invention relates to eye bars used as tension members in bridges and similar structures and more particularly relates to the construction of the openings or eyes in the heads on the ends of the eye bars.

Such eye bars, as made heretofore, have had cylindrical openings or eyes in the ends or heads thereof, these eyes being drilled, bored or otherwise finished to a diameter from one-fiftieth to one-thirty-second of an inch larger than the diameter of the connecting pins to facilitate insertion of the pins when the eye bars are being assembled in place in a bridge. The diameter of the cylindrical eyes being larger than that of the pins there is only a line contact between the perimeters of the eyes and connecting pins at the time the eye bars are first put into place.

After the eye bars have been built into a bridge and the full load that they are to carry is applied thereto the tension causes the heads of the eye bars to bend until a surface contact is obtained between the eyes and connecting pins, this surface contact extending over about one-half the perimeter of the connecting pins. The result of such bending of the heads is that the eye bars lengthen slightly and excessive fiber stresses are formed in the heads of the eye bars, which weaken and makes the breaking point of the eye bars more or less uncertain.

If it were practicable to have the eyes of the bars and the connecting pins of exactly the same diameter, bending of the head by the application of tension to the bars would be made impossible. But sufficient clearance must be provided between the eyes and pins to enable the pins to be easily and quickly inserted in place in assembling the eye bars.

The object of my invention is the provision in such eye bars of an improved form of eye whereby bending of the heads of the eye bars when put into use is prevented, the bending strains ordinarily present in the heads of the eye bars when the bars are in use are eliminated and the effective strength of the eye bars is increased and wherein the size of the eyes is sufficiently larger than the connecting pins as to insure the pins being readily insertable in the eyes when being put in place.

In the drawings, Figure 1 is a plan showing an eye bar made in accordance with my invention, and Figure 2 is a similar plan showing the eye bar with its connecting pins positioned in the eyes thereof.

Referring now more particularly to the drawings, the numeral 2 designates the shank portion of my improved eye bar and 3, 3 are integral head portions formed at each end of the pin portion. The heads 3 are provided with openings forming eyes 4 for receiving the pins used in connecting the overlapping ends of oppositely extending eye bars when assembled in a bridge or like structure.

The eyes 4 may be formed in any approved manner but preferably they are formed by boring or otherwise machining a hole in each head 3, on the center $b$, this hole being finished to exactly the diameter of the connecting pin that is later inserted in the eye 4.

In order to maintain a surface contact or bearing between the eyes and pins when the pins are positioned in place and yet enable the pins 5 to be readily inserted, the heads 3 are again bored or machined on the center $c$, this center $c$ being slightly offset rearwardly of the center $b$ and this boring operation forming an opening of somewhat larger diameter than that of the pin 5, in this way enlarging the rear portion of the eyes so as to facilitate positioning of the pins in the eyes. Whether the smaller hole on the center $b$ or larger hole on the center $c$ is bored first is immaterial and the eyes can be formed in either way.

When the rear portions of the eyes are enlarged as has been described, the pin 5 is readily entered and moved forward into surface contact with the bearing portion of the perimeter of the eyes. It will be readily apparent that when this is done there will be a surface contact between the engaging surfaces of the eyes and pins so that when the full load is later put upon the eye bars there can be no bending of the eye bar heads and that the bending stresses heretofore present in eye bars of this class will be eliminated.

I claim:—

1. In the manufacture of eye bars for bridges and like structures, the steps including forming eyes in the heads of said bar by first boring a hole in said heads of the same diameter as the pins to be fitted in said eyes, and then reboring said heads from a center slightly to the rear of the center of the first formed hole so as to enlarge the rear portion of said hole to facilitate the insertion of the connecting pins and at the same time permit the forward or bearing portion of the hole to remain the same diameter as the pins so as to provide a full bearing surface for a material area of the pin surface.

2. An eye bar for bridges and like structures, comprising a shank having integral heads on the ends thereof, said heads having eyes to receive connecting pins, said eyes having a curved perimeter composed of two truly circular surfaces, one of said surfaces having a smaller radius than the other and being adapted to have a surface contact with approximately one-half the perimeter of the connecting pins to thereby eliminate bending strains in the ends of the eye bars, and said eyes being of an area greater than the cross-sectional area of said pins, so as to facilitate insertion of said pins in the eyes.

In witness whereof, I have hereunto signed my name.

CARL GUSTAF EMIL LARSSON.